2,945,783
ALUMINUM PROTEIN ANTACID AND PROCESS OF MAKING

Stewart M. Beekman, Berkeley Heights, N.J., and John E. Garizio, Garden City, N.Y., assignors to Reheis Company, Inc., a corporation of New York No Drawing. Filed June 20, 1957, Ser. No. 667,050

9 Claims. (Cl. 167—55)

This invention relates to an antacid and the process of making it.

A form of the invention that is particularly useful is the composition including aluminum hydroxy carbonate gel and water dispersible protein intimately dispersed thereinto, the whole being then co-dried to solid state retaining some moisture. The invention will be first illustrated, therefore, by description in connection with this embodiment of it.

There has been proposed heretofore the precipitate formed by mixing ammonium alum with ammonium hydroxide in contact with acacia, gelatin or the like (U.S. Patent 2,166,868). When used as an antacid, the powder is said to be effective to the extent that 1 gram of the powder is capable of "adsorbing 3 to 5 cc. of N/10 hydrochloric acid." Also there has been proposed a precipitate of aluminum proteinate which is washed, dried, and reduced to powder form (U.S. Patent 2,721,861).

This invention provides a dispersed system of aluminum hydroxy carbonate and a water soluble protein in water in which no separation of solid material occurs. The resulting codispersion, without any filtration, is subjected to incomplete drying.

The dried gel so formed, when tested as an antacid with artificial gastric juice, has the power to consume approximately 150–225 or more cc. of N/10 hydrochloric acid per gram of the dried gel. Furthermore, the partially dried gel in contact with the artificial gastric juice not only shows very rapid initial reaction and neutralization of acidity but also prolonged action that maintains the pH within the optimum pH range during an unusually long period, even when portions of the artificial gastric juice are withdrawn continuously and other fresh portions are introduced. Our product shows these advantages not only as freshly made and either not dried or dried to seemingly dry condition, but also with a sample so dried that has now been tested after storage over a period of approximately 12 months.

Briefly stated, our invention comprises the herein described process and product of dispersing a water soluble protein in an aqueous liquid gel of aluminum hydroxy carbonate or other aluminum gel of kind to be described, without separation of any solid material. In ordinary commercial practice, the invention includes drying the resulting dispersion to solid form without destroying the high rate of antacid activity thereof.

The protein and gel composition is useful also as a sticker in plant spray compositions. Thus our new composition may be mixed in the proportion of 0.5%–5% with the insecticide DDT, lead arsenate, Bordeaux mixture, lime-sulfur, or the like, the whole suspended in water, with or without conventional additives, and then sprayed upon foliage. Our gel and protein combination "plates" on the leaves and provides good holding of the insecticidal material.

As to materials, the aluminum gel used for best results is a water dispersable aluminum hydroxy carbonate $Al_2(OH)_y(CO_3)_z$. In this formula $y$ and $z$ are numbers other than 0 and $2z+y$ equal 6. It is to be understood that this empirical formula is not intended to show the molecular complexity or the exact structure. The proportions of materials that we find particularly satisfactory are represented by the above formula in which $z$ is variable from 0.2–1.2. For best results $z=0.3$–0.6. When the proportion of carbonate ($CO_3$) to aluminum (Al) is fixed, the proportion of the hydroxyl groups in the product is automatically established.

The hydroxy carbonate so made is filtered, washed to remove soluble salts, redispersed in water to a liquid gel, and then mixed into an intimate dispersion with the protein.

For some purposes we may substitute the aluminum hydroxy carbonate gel described by other water dispersible aluminum basic salt gel, as for instance by aluminum magnesium hydroxy carbonate gel made as described in application for Patent Serial No. 557,257 filed January 4, 1956, now Patent No. 2,797,978. Another gel that may be used is aluminum hydroxy phosphate gel.

The gel may be made by reaction of an aluminum salt and sodium carbonate, both in aqueous solution, as described under Example 1. The proportion of the carbonate is varied to provide in the gel the desired ratio of carbonate groups ($CO_3$) to the aluminum. The reaction involved for representative proportions may be written thus—

$Al_2Cl_6 + 3Na_2CO_3 + 2H_2O$
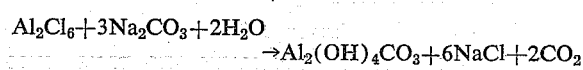
$\rightarrow Al_2(OH)_4CO_3 + 6NaCl + 2CO_2$ For this particular gel, the proportion of $CO_2$ is about 23% on the dry basis. Other suitable proportions are 2–25% of $CO_2$.

The protein used is one that is water dispersible as for instance, gelatin, lactalbumin, casein, egg albumen, or solubilized soy protein. We find that a mixture of casein and lactalbumin in about the proportion in which they occur in cow's milk or skim milk powder is satisfactory and economical. An example of soy protein that we have used is a mixture of the fat and solubilized protein of soy beans, in approximately the proportions in which the fat and protein occur in the beans. The solubilizing of the protein may be effected by partial hydrolysis, with either a proteolytic enzyme or with hydrochloric or like acid.

Water is used not only to provide the hydroxy content of the aluminum gel but also to disperse the materials during the formation of the compounded aluminum gel and protein. The proportion of the protein used is variable. Because no stoichiometric reaction is involved, such as the precipitation of an aluminum proteinate, we may use a relatively small proportion of the protein as for instance 0.3 part of actual protein on the dry basis for 100 parts of gel calculated as alumina. From this very small proportion, the amount of the protein may be increased, as from 5 to 100 parts for 100 parts of the alumina. Also we may admix additional amounts of the protein to the gel made and dried as described, as in the proportion of 1–10 parts of the additional protein for 1 of the gel. Such a protein enriched mixture has the advantage, from the standpoint of nutrition, of decreased variation from the normal taste of the protein used, with the retention of the unusual antacid properties stated above. Further the effect of even a relatively small proportion of the alumina gel in the mixture is to raise the pH of the gastric juice and thus reduce somewhat the appetite.

As to conditions of manufacture, the aluminum gel in a liquid aqueous dispersion is mixed with the selected protein with vigorous agitation. The mixing is continued until the dispersion is substantially uniform. Then the whole is subjected to drying, as at a temperature between ambient and the temperature of heat denaturation of the protein, as below 70°–75° C. Ordinarily we use temperatures of around 40°–60° C. In any case we discontinue the drying before the gel is completely freed of mechanically held water. Thus we leave in the dried gel sufficient free water, as measured by the Karl Fischer method, to correspond to about 5%–25% of water on the weight of the dried gel.

The invention will be further illustrated by description in connection with the following specific examples of the practice of it. In these examples and elsewhere herein the proportions are expressed as parts by weight unless specifically stated to the contrary.

*Example 1*

REACTIVE BASIC ALUMINUM CARBONATE GEL

This example, forming no part of the invention, shows a suitable manner of making a representative aluminum carbonate gel for use with the protein in subsequent examples.

This reactive basic aluminum carbonate gel, used to prepare the new highly reactive protein-containing dry gels, contains as made about 10 parts of aluminum calculated as $Al_2O_3$, 75 of water, and 5.1 parts of carbonate calculated as $CO_2$.

The sample was prepared by the slow addition of 8 moles of aluminum chloride ($AlCl_3$) to 12 of sodium carbonate, both in aqueous solution. The precipitate was separated by filtration and washed with water until free of soluble salts. This gave a reactive form of aluminum basic carbonate gel.

*Example 2*

ALUMINUM HYDROXY CARBONATE GEL PLUS SKIM MILK SOLIDS, WEIGHT RATIO OF $Al_2O_3$ TO SKIM MILK SOLIDS 1:1

Of the non-fat milk solids 360 parts were dispersed in 1680 parts of water at room temperature using a laboratory model Dispersator operated at moderate speed. Into the dispersed milk solids 3600 parts of the washed aluminum hydroxy carbonate gel of Example 1 were introduced in increments. As increasing quantities of the aluminum hydroxy carbonate gel was added, the speed of the Dispersator was increased. After all the gel had been added, the mixing was continued at high speed for 20 minutes. The resulting intimate dispersion was thixotropic. It was transferred, without any separation of solid material, to trays and then dried incompletely but to solid form in circulating air at 50° C.

The dried material was then finely ground until the product, on wet screening, passed to the extent of 83.7% through 325 mesh.

The product contained 31.65% $Al_2O_3$, 18.3% protein, 9.16% carbonate as $CO_2$, and 16.8% moisture as determined by the Karl Fischer method. The dried product had an acid consuming capacity of 169 ml. N/10 hydrochloric acid per gram. The apparent density of the powder was 0.34 g. per cc.

The reaction velocity was tested by the Reheis method described in my application for patent Serial No. 387,028, filed October 19, 1953, issued as Patent No. 2,802,773, and also by the alternative and more significant modified procedure of Holbert, Nobel and Grote (Journal of the American Pharmaceutical Association, 36, 149 (1947), 37, 292 (1948), Murphey, 41, 361 (1952)). This procedure calls for the addition of 1 dose of antacid to 150 ml. of pH 1.5 hydrochloric acid containing 2.0 grams pepsin N.F. per liter (artificial gastric juice) at 37.5° C., withdrawal of 20 ml. of the artificial gastric juice every 10 minutes, and replacement with an equal volume of fresh gastric juice at the same rate. In our modification of this method, we exchange the fresh for the partly reacted gastric juice at the same rate by continuous introduction of fresh acid and overflow of the old. This technique simulates the loss of gastric juice through the pylorus and also simulates the formation of replacement gastric juice by the stomach glands.

2 grams of the above powder when tested by this H.N.&G. method showed a rise of pH to 3.78 in 30 seconds and maintained the pH of the said juice at 3.5–4.2 for more than 3 hours when the gastric juice was replaced continuously at the rate stated.

*Example 3*

ALUMINUM HYDROXY CARBONATE GEL PLUS MILK PROTEIN, WEIGHT RATIO OF $Al_2O_3$ TO MILK PROTEIN 4:1

The procedure described in Example 2 is carried out with 90 grams of milk protein concentrate (Sheftene 60 containing 60% protein and 27.5% lactose). This was dispersed in 2310 parts of water. The resulting aqueous milk protein dispersion was thoroughly mixed with 3600 parts of washed aluminum hydroxy carbonate gel, made as described in Example 1, into a fluid dispersion. The resulting mixture was dried and pulverized as described in Example 2.

The product showed an acid neutralizing capacity of 229 ml. N/10 hydrochloric acid per gram of the gel, apparent density 0.17 gr. per ml., and 85% through 325 mesh on wet screening. Two grams of the powder, when tested by the procedure for antacid activity by the modified H.N.&G. procedure, raised the pH of the simulated artificial gastric juice to 4.1 in 30 seconds and maintained the pH of the juice, with continuous replacement, between 3.5–4.4 for 3 hours.

*Example 4*

ALUMINUM HYDROXY CARBONATE GEL AND EGG ALBUMIN, WEIGHT RATIO $Al_2O_3$ TO EGG ALBUMIN 4:1

The procedure outlined for Example 3 was followed except that 90 parts of egg albumin were used instead of 90 parts of milk protein concentrate. The antacid activity of this dried gel was determined by the above described modified H.N.&G. method; a 2 gram sample was found to increase the pH of the artificial gastric juice to 3.9 in 30 seconds and to maintain the pH at 3.5–4.3 for 3½ hours with continuous replacement.

*Example 5*

The procedure of any of the Examples 2–4 is followed except that the gel of Example 1, used in the said Examples 2–4, is replaced by an equal weight on the dry basis of the aluminum magnesium hydroxy carbonate made as described in application for patent Serial No. 557,257, filed January 4, 1956, by Stewart M. Beekman and, more specifically, as follows:

*Formation of precipitate No. 1.*—6.24 parts of soda ash $Na_2CO_3$ were dissolved in 107.4 parts of water at room temperature. Aluminum hydroxy carbonate gel was precipitated by adding 25.3 parts of aluminum chloride solution of density 24° Bé. at 20° C., with stirring, to the sodium carbonate solution at such rate that the total time required for the addition was about 36 min. The pH of the reacting mixture at the start was 10.85 and approximately 5.4 after addition of the last of the aluminum chloride solution.

*Formation of precipitate No. 2.*—4 parts of magnesium chloride $MgCl_2 \cdot 6H_2O$ were dissolved in 36 parts of water. The resulting solution was added to precipitate No. 1 contained in the reaction vessel. A 10% sodium carbonate solution, containing 2.1 parts of soda ash in 18.9 parts of water, was added to the reaction vessel over a period of 8 min. The pH changed from 5.4 at the start to about 8.1 at the end of the addition of the sodium carbonate.

The precipitated slurry containing the aluminum hydroxy gel and the magnesium carbonate precipitated in association therewith was aged 1 hour. Then the slurry was filtered through a plate and frame filter press at 48 p.s.i. pressure and the filter cake washed with water until free of soluble salts.

The filter cake was then discharged from the filter press and dried in air at approximately 105° F. The product on the dry basis analyzed $Al_2O_3$ 54.6%, MgO 5.4%, and $CO_2$ 18.1%.

The wet filter cake was mixed with the protein as described.

*Example 6*

The procedure of any of the Examples 2–4 is repeated except that the gel of Example 1 was replaced by an equal weight on the dry basis of aluminum hydroxy phosphate gel.

This phosphate gel was prepared as follows: 114 parts of disodium phosphate solution 12.0° Bé. was added slowly at 24° C. to 93 parts of aluminum sulfate solution 19.2° Bé., with moderate agitation. The pH of the reaction mixture at the end of the addition of the disodium phosphate solution was 3.1.

25 pounds of aqueous ammonia solution 15.85° Bé. was then slowly added, the pH of the reaction mixture rising during the addition of the ammonia to 7.1. The resulting mixture including precipitated aluminum hydroxy phosphate was aged for 2 hours and then filtered through a filter press at 45 lbs. pressure. The filter cake was washed with water until the effluent was negative in tests for sulfate and phosphate ions.

The resulting firm white thixotropic cake was found to have an aluminum content of 8.9% calculated as $Al_2O_3$ and a phosphate content of 9.65% calculated as $P_2O_5$. The acid consuming capacity of the gel in incompletely dried form was 54 ml. N/10 HCl per gram.

The products of Examples 5 and 6 are antacids but are not recommended as replacements for the products of Examples 2–4.

*Example 7*

The procedure of any of the Examples 1–5 is followed exactly except that the protein there used is replaced by an equal weight of any other protein disclosed herein.

It will be understood that it is intended to cover all changes and modifications of the examples of the invention herein chosen for the purpose of illustration which do not constitute departures from the spirit and scope of the invention.

The Holbert, Nobel and Grote test method referred to in the claims is carried out by addition of 1 dose of antacid to 150 ml. of pH 1.5 hydrochloric acid containing 2.0 grams pepsin N.F. per liter (artificial gastric juice) at 37.5° C., and continuously introducing fresh artificial gastric juice, removing the old juice by overflow, at the rate of 2 ml. per minute.

We claim:
1. A process for making an antacid composition which comprises forming an aqueous dispersion of a water-dispersible protein selected from the group consisting of casein, gelatin, lactalbumin, egg albumin and solubilized soya protein and a water-dispersible basic aluminum hydroxy salt gel at a pH at which aluminum proteinate does not precipitate, and removing sufficient water from the dispersion at a temperature below the heat denaturation temperature of the protein to recover a solid product effective as an antacid.

2. A process in accordance with claim 1 in which sufficient water is removed to recover a solid product containing from 5 to 25% water by weight.

3. A process in accordance with claim 1 in which the protein is dispersed in water to form a stable dispersion, and this dispersion mixed with an aqueous dispersion of the gel.

4. A process in accordance with claim 1 in which the protein is dispersed in water to form a stable dispersion and the gel mixed into this dispersion.

5. An antacid composition obtainable by the process of claim 1 effective by the Holbert, Noble and Grote test method using a one gram sample to maintain the pH of artificial gastric juice at at least 3.5, and free from precipitated aluminum proteinate, consisting essentially of a water-dispersible protein selected from the group consisting of casein, gelatin, lactalbumin, egg albumin and solubilized soya protein and a water-dispersible basic aluminum hydroxy salt gel, in the proportion by weight of from 0.3 to 100 parts protein per 100 parts gel calculated as $Al_2O_3$.

6. An antacid composition in accordance with claim 5 in which the aluminum salt gel is aluminum hydroxy carbonate.

7. An antacid composition in accordance with claim 5 in which the aluminum salt gel is aluminum hydroxy phosphate.

8. An antacid composition in accordance with claim 5 in which the aluminum salt gel is aluminum magnesium hydroxy carbonate.

9. An antacid composition in accordance with claim 5 in which the protein is casein contained in milk.

References Cited in the file of this patent
UNITED STATES PATENTS

| | | |
|---|---|---|
| 2,362,386 | Lipschitz | Nov. 7, 1944 |
| 2,721,861 | Paterson | Oct. 25, 1955 |

FOREIGN PATENTS

| | | |
|---|---|---|
| 715,874 | Great Britain | Sept. 22, 1954 |

OTHER REFERENCES

Douthwaite: British Med. Jour., No. 4777, July 26, 1952, p. 180.